(12) United States Patent
Whitney et al.

(10) Patent No.: US 6,685,406 B2
(45) Date of Patent: Feb. 3, 2004

(54) PERFORATED NUT TENSIONING SYSTEM

(75) Inventors: Robert M. Whitney, New Hartford, NY (US); Charles B. Gibbons, Whitesboro, NY (US); Timothy J. Trautman, East Aurora, NY (US)

(73) Assignee: Riverhawk Company, New Hartford, NY (US)

( * ) Notice: Subject to any disclaimer, the term of this patent is extended or adjusted under 35 U.S.C. 154(b) by 0 days.

(21) Appl. No.: 10/280,423

(22) Filed: Oct. 25, 2002

(65) Prior Publication Data
US 2003/0086770 A1 May 8, 2003

Related U.S. Application Data
(60) Provisional application No. 60/340,718, filed on Oct. 30, 2001.

(51) Int. Cl.$^7$ ................................................. F16B 31/00
(52) U.S. Cl. ..................... 411/14.5; 411/432; 411/434; 411/916; 411/917
(58) Field of Search .................... 411/14.5, 14, 916, 411/917, 432, 433, 434

(56) References Cited

U.S. PATENT DOCUMENTS

| 2,571,265 A | * | 10/1951 | Leufven ...................... 411/434 |
| 2,760,393 A | * | 8/1956 | Stough ...................... 81/57.38 |
| 3,618,994 A | * | 11/1971 | Gepfert et al. ................ 403/71 |
| 3,665,758 A | * | 5/1972 | Tiller ..................... 73/862.381 |
| 3,674,193 A | * | 7/1972 | Robinson ..................... 226/100 |
| 3,682,440 A | * | 8/1972 | Walker ....................... 254/29 A |
| 3,695,096 A | * | 10/1972 | Kutsay ......................... 73/761 |
| 4,075,923 A | * | 2/1978 | Latham ....................... 411/378 |
| 4,120,230 A | * | 10/1978 | Bunyan ....................... 411/411 |
| 4,182,215 A | * | 1/1980 | Green et al. ................. 411/434 |
| 4,560,147 A | * | 12/1985 | Bowdren ...................... 254/231 |
| 4,810,919 A | * | 3/1989 | Ponce et al. ................. 310/217 |
| 5,046,906 A | * | 9/1991 | Bucknell ..................... 411/432 |
| 5,083,889 A | * | 1/1992 | Steinbock .................... 411/432 |
| 5,253,967 A | * | 10/1993 | Orban et al. ................. 411/432 |
| 5,582,496 A | * | 12/1996 | Ambrico et al. ............. 411/432 |
| 5,601,505 A | * | 2/1997 | Tada .......................... 474/110 |
| 5,690,458 A | * | 11/1997 | Junkers ....................... 411/432 |
| 6,199,453 B1 | * | 3/2001 | Steinbock .................. 81/57.38 |

OTHER PUBLICATIONS

Hydraulics Technology, Inc, How HTI Systems Work, 2 pages, from www.htico.com/how.html, undated.*
Riverhawk Co., Hydraulic Tensioner Nut, 2 pages, plus cover page from www.web.archive.org showing posting date Apr. 9, 2001 or earlier, downloaded from www.riverhawk.com/tensionnut.html, 2 pages.*

* cited by examiner

Primary Examiner—Robert J. Sandy
Assistant Examiner—Katherine Mitchell
(74) Attorney, Agent, or Firm—Jaeckle Fleischmann & Mugel, LLP

(57) ABSTRACT

A stud tensioning device includes a nut having internal threads and external threads. The internal threads engage corresponding threads on the stud. At least two axial bores are defined by the nut, and posts are disposed in the bores. Each post at a first end thereof engages a stop surface, and at a second end thereof extends external to the bores and axially beyond a free end of the stud in a direction away from the structural member. A load cell threadingly engages the nut applying an axially-directed force on the posts in a direction toward the structural member and on the nut in a direction away from the structural member to thereby tension the stud.

27 Claims, 7 Drawing Sheets

DIRECTION OF FORCE, OUTER →T

F

← DIRECTION OF LOAD, INNER — 34, 36, 58

— CENTERLINE

PERFORATED NUT TENSIONING SYSTEM

CROSS REFERENCE TO RELATED APPLICATIONS

This application claims the benefit of U.S. Provisional Patent Application Serial No. 60/340,718, filed Oct. 30, 2001.

FIELD OF THE INVENTION

The present invention relates to a nut tensioning device, i.e., a device that applies and retains tension to a stud or bolt.

BACKGROUND OF THE INVENTION

Studs and/or bolts are tensioned in order to provide a secure mechanical connection between structural members, such as, for example, a pair of opposing flanges on a piece of machinery. Tensioning of a stud or bolt is typically accomplished by a tensioning system or device that applies an axially-directed force to the stud in a direction away from the structural member. The tensioning device generally includes a gripping means and a load cell. An axially-directed force is applied by the load cell to the gripping means. The gripping means transfers the force to the stud, and thereby axially tensions or stretches the stud. The stud is then mechanically retained in its stretched or tensioned position by, for example, a nut that threadingly engages external threads formed on the stud and which is tightened down to engage the flange.

Some conventional tensioning systems utilize mechanical load cells, whereas other tensioning systems use hydraulic load cells. Mechanical load cells convert mechanical pressure or force to the axial tensioning force, whereas hydraulic load cells convert hydraulic pressure to the axial tensioning force. Tensioning systems may be configured as either internal, external or integrated tensioning systems.

External tensioning systems have a gripping means that engages threads formed on the exterior of the stud. Thus, the stud must extend a sufficient amount beyond the nut to enable adequate engagement of the gripping means on the threaded exterior of the stud. Further, the load cell of an external tensioning system is disposed over the end of and surrounds the stud and nut. Thus, there must be a certain degree of separation between the stud and nut being tensioned and any adjacent stud/nut disposed on the same structural member or flange. In other words, an external tensioning system has a large "foot print" which may render it unsuitable for use in applications wherein multiple studs are in relatively close proximity with each other.

Internal tensioning systems utilize a gripping means that engages an internally threaded feature, such as, for example, a bore, defined by or formed in the stud. Thus, the stud must include the specially-formed internally threaded feature to receive the gripping means. Further, and similar to the external tensioning system, internal systems require a relatively large footprint.

Integrated tensioning systems integrate the load cell with the nut. The nut forms a nut piston and a nut cylinder. The nut piston is threaded onto external threads formed on the stud, and the nut cylinder engages the flange. The load cell, such as, for example, a hydraulic chamber, is formed between the nut piston and nut cylinder. The load cell is actuated to displace the nut piston axially away from the nut cylinder and away from the structural member or flange, thereby stretching the stud. Unlike the internal and external tensioners, the integrated tensioner must remain in place in order to maintain tension on the stud since the nut is an integral part of the tensioner. Further, in order to maintain the stud in its tensioned/stretched state, the load cell must remain actuated or pressurized. Thus, in the case of an integrated tensioner having a hydraulic load cell, the hydraulic fluid must remain in the chamber when the part or flange to which the tensioner is affixed is placed into service. The hydraulic fluid, depending on the particular application, may degrade, such as, for example, due to exposure to high operating temperatures. Furthermore, the hydraulic fluid may over time leak or solidify, making removal of the tensioner problematic. Moreover, the hydraulic chamber defined by the integrated system has a relatively limited capacity and therefore the integrated system has a correspondingly limited load capacity. Similar disadvantages exist for mechanical load cells.

Therefore, what is needed in the art is a tensioner device that does not require a specially configured stud or a stud that extends beyond the nut.

Furthermore, what is needed in the art is a tensioner device having a relatively small footprint.

Still further, what is needed in the art is a tensioner device with a relatively large load capacity.

Even further, what is needed in the art is a tensioner device that is suited for retrofit applications, such as, for example, when the surface of the structural member surrounding the nut is not suitable for being engaged by a conventional tensioning system, or when there is no suitable surface on the stud to which a conventional gripping means can be attached.

SUMMARY OF THE INVENTION

The present invention provides a stud or bolt tensioning system for tensioning a stud or bolt extending from a structural member.

The invention comprises, in one form thereof, a nut having internal threads and external threads. The internal threads engage corresponding threads on the stud. At least two axial bores are defined by the nut, and posts are disposed in the bores. Each post at a first end thereof engages a stop surface, and at a second end thereof extends external to the bores and axially beyond a free end of the stud in a direction away from the structural member. A load cell threadingly engages the nut applying an axially-directed force on the posts in a direction toward the structural member and on the nut in a direction away from the structural member to thereby tension the stud.

An advantage of the present invention is that it has a relatively small footprint, and can therefore be used for tensioning finely-pitched studs or closely-spaced studs.

Another advantage of the present invention is that it has a relatively large load capacity.

Yet another advantage of the present invention is that it is well-suited for retrofit applications, such as, for example, where there is no suitable surface surrounding the nut against which a conventional tensioning system could act and/or no suitable surface on the stud to which a conventional gripping means can be attached.

A still further advantage of the present invention is that the load cell grips the nut, and thus the present invention does not require a footprint outside the nut. Thus, no special features are required on the stud for engaging the tensioner.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE INVENTION

Figure 1:
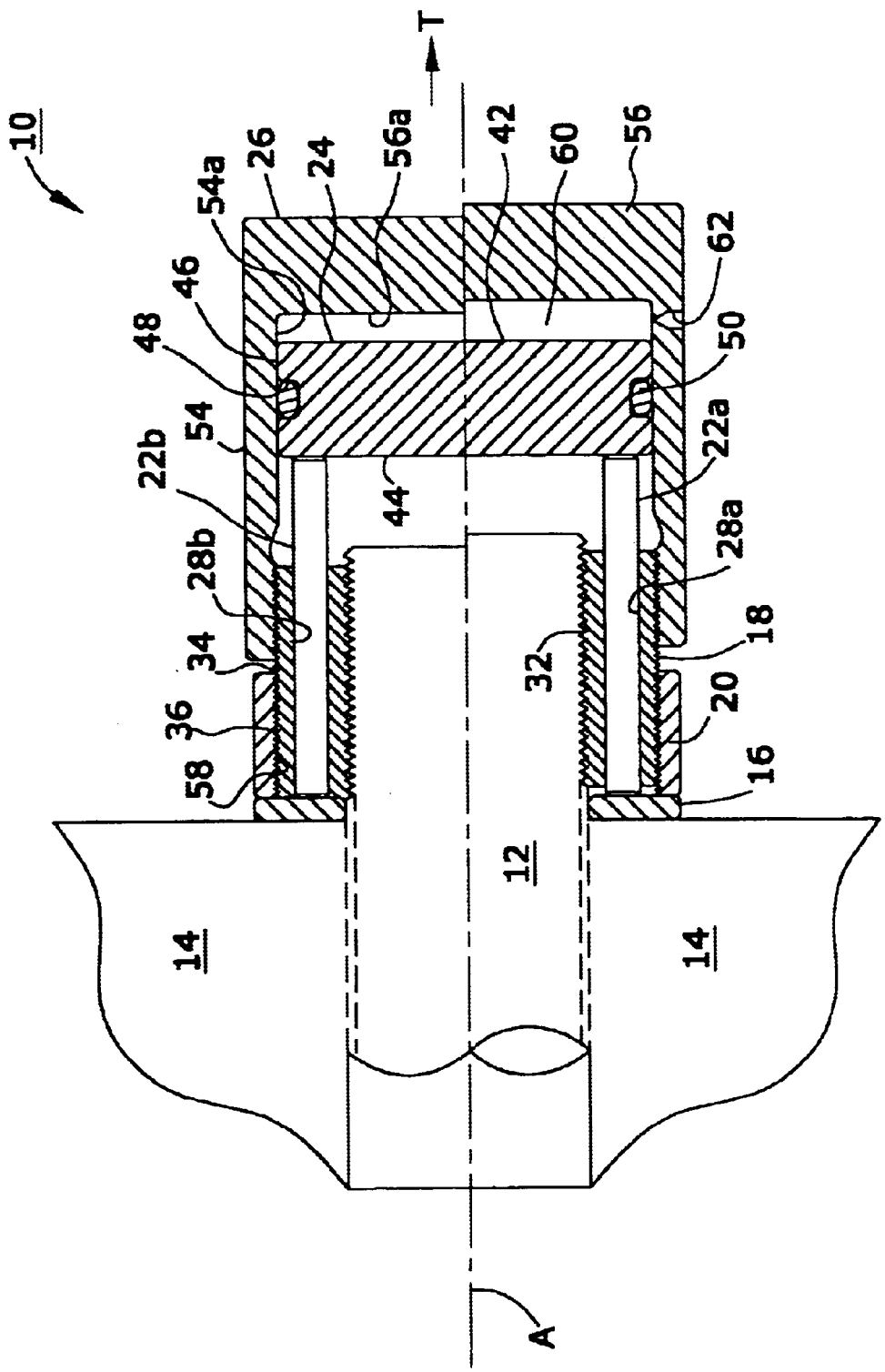
FIG. 1 is a sectional view of one embodiment of the perforated nut tensioning system of the present invention.

Referring now to FIG. 1, there is shown one embodiment of a perforated nut tensioning system of the present invention. Perforated nut tensioning system (PNTS) 10 generally couples flange 14 together with, for example, an opposing flange (not shown) disposed on the side of flange 14 that is opposite PNTS 10. Stud 12 extends through a bore (not referenced) of flange 14 and, for example, into and through a corresponding bore (not shown) in the opposing flange. The end of stud 12 which is not shown extends from the bore in the opposing flange and is, for example, terminated by a nut or head that engages the face of the opposing flange. Perforated nut tensioning system (PNTS) 10 stretches stud 12 in an axial direction away from flange 14, i.e., in the direction of arrow T, and then maintains stud 12 in the tensioned/stretched condition by coupling stud 12 to flange 14. Stud 12 has a central axis A, and includes external threads (not referenced) formed on at least a portion of the axial length thereof and extending from the bore in flange 14.

PNTS 10 includes washer 16, nut 18, retaining ring 20, posts 22a and 22b, tensioner piston 24 and tensioner cylinder 26.

Washer 16 is received over stud 12 and disposed adjacent the outer surface (not referenced) of flange 12. Washer 16 is a conventional washer member.

Nut 18 includes internal threads 32 corresponding to the external threads of stud 12. Nut 18 is threaded onto stud 12 and down onto washer 16 to thereby place washer 16 into abutting engagement with flange 14. Nut 18 defines at least two axially-directed cavities or bores 28a and 28b therethrough. Bores 28a and 28b are substantially parallel relative to central axis A, and may also be referred to as "perforations". The outside surface (not referenced) of nut 18 is optionally configured, such as, for example, square or hexagonal in shape, for receiving a tightening implement such as a wrench. Further, nut 18 includes external threads 34 formed on the outside surface (not referenced) thereof. In the embodiment shown, nut 18 includes two bores 28a, 28b that receive corresponding posts 22a, 22b. However, it is to be understood that the present invention can be alternately configured, such as, for example, with more than two bores defined by the nut, and with corresponding posts disposed in each bore.

Retaining ring 20 is a collar-like member that includes internal threads 36 that correspond to external threads 34 on the outside surface of nut 18. Retaining ring 20 is threaded onto nut 18 and into engagement with washer 16.

Posts 22a and 22b are received within bores 28a and 28b, respectively, of nut 18. Posts 22a and 22b have one end (not referenced) that is disposed adjacent to and/or abuttingly engages washer 16 and an opposite end (not referenced) that is disposed outside of bores 28a, 28b, respectively. More particularly posts 22a and 22b extend in direction T a predetermined amount outside of bores 28a, 28b, respectively, and beyond nut 18 in a substantially parallel manner relative to central axis A.

Tensioner piston 24 is a substantially cylindrical member that is slidingly disposed within tensioner cylinder 26. Tensioner piston 24 includes an inner surface 42 an outer surface 44 and a side/peripheral surface 46. Outer surface 44 engages the ends (not referenced) of posts 22a, 22b that extend from nut 18 in direction T. Peripheral surface 46 defines groove 48 within which is disposed a sealing member 50, such as, for example, an elastically-deformable O-ring.

Tensioner cylinder 26 is a substantially cylindrical, cup-shaped member having sidewall 54 with an inside surface 54a, and a closed bottom 56 having inside surface 56a. Inside surface 54a at the end thereof opposite closed bottom 56 defines internal threads 58 that correspond to and engage external threads 34 of nut 18. As described above, tensioner piston 24 is disposed within tensioner cylinder 26. More particularly, tensioner piston 24 is disposed within tensioner cylinder 26 such that inner surface 42 of piston 24 faces, i.e., is opposite, inside surface 56a of closed bottom 56 of cylinder 26. Hydraulic chamber 60 is defined between inner surface 42 of piston 24 and inside surface 56a of closed bottom 56 of cylinder 26, and is peripherally or radially bounded by a portion of sidewall 54 of cylinder 26. Sealing member 50 sealingly engages inside surface 54a, to thereby seal hydraulic chamber 60. Sidewall 54 defines hydraulic port 62 through which hydraulic fluid is supplied to and/or drawn from hydraulic chamber 60. Thus, cylinder 26 and piston 24 conjunctively define load cell 30 of PNTS 10.

Figure 2A:
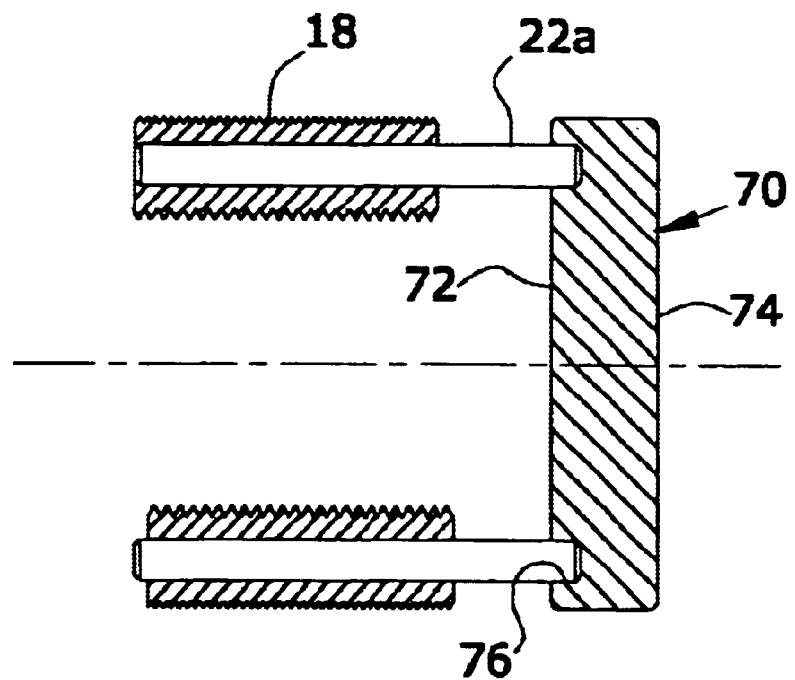
FIG. 2A is a sectional view of a portion of the perforated nut tensioning system of FIG. 1 with a post support alignment plate installed.
Figure 2B:
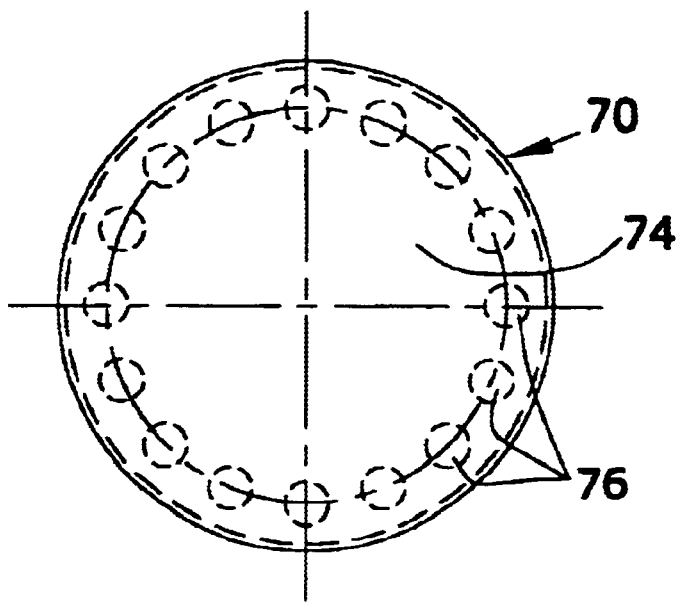
FIG. 2B is a top view of the post support and alignment plate of the perforated nut tensioning system of FIG. 1.

Referring now to FIG. 2A, an optional post support and alignment plate 70 is shown operably positioned relative to PNTS 10. Post plate 70 is a substantially cylindrical member having bottom surface 72 and top surface 74. Bottom surface 72 defines a plurality of bores 76 which, as is best shown in FIG. 2B, extend at least partially through post plate 70 in an axial direction toward top surface 74. Posts 22a and 22b are received and disposed within a corresponding one of bores 76, and top surface 74 engages outer surface 44 of piston 24.

In use, the aforementioned component parts of PNTS 10 are operably disposed in relation to stud 12. More particularly, washer 16 is placed onto stud 12 and generally down into engagement with flange 14. Nut 18 is then threaded onto stud 12 and generally down into engagement with washer 16, i.e., internal threads 32 of nut 18 are engaged with the external threads (not shown) of stud 12. Similarly, retaining ring 20 is threaded onto nut 18 and generally down into engagement with washer 16. More particularly, internal threads 36 of retaining ring 20 are engaged with external threads 34 of nut 18. Posts 22a, 22b are inserted into bores 28a, 28b, respectively, of nut 18 and generally down into engagement with washer 16.

The optional post support and alignment plate 70 is positioned such that posts 22a and 22b are received and disposed within a corresponding one of bores 76, and such that top surface 74 will engage outer surface 44 of piston 24. Thus, post plate 70 aligns and supports posts 22a, 22b, thereby improving load sharing between the posts. Piston 24 is inserted into cylinder 26, and cylinder 26 is treaded onto nut 18. More particularly, internal threads 58 of cylinder 26 are engaged with external threads 34 of nut 18.

A source of hydraulic fluid is connected to hydraulic port 62, and fluid is thereby provided to hydraulic chamber 60. As hydraulic chamber 60 fills with fluid and becomes pressurized, the fluid exerts an axially directed force that tends to separate piston 24 and cylinder 26. Outer surface 44 of piston 24 is placed engagement with posts 22a, 22b by the displacement of piston 24 under the hydraulic pressure within hydraulic chamber 60. Alternatively, with optional post support and alignment plate 70 positioned such that posts 22a and 22b are received and disposed within a corresponding one of bores 76, top surface 74 thereof is brought into engagement with outer surface 44 of piston 24 by the hydraulic chamber. Thus, the axial position of piston 24 relative to flange 14 is established or fixed by the abutting engagement of outer surface 44 of piston 24, or alternatively by the abutting engagement of top surface 74 of alignment plate 70, with posts 22a, 22b which are, in turn, abuttingly engaged with washer 16. As chamber 60 is further pressurized, cylinder 26 is displaced in direction T axially away from flange 14. As described above, cylinder 26 is threadingly engaged with nut 18 and thus the displacement of cylinder 26 is transferred to nut 18.

Nut 18 is threadingly engaged with stud 12, and thus the axial force applied to nut 18 is transferred to stud 12. This force stretches stud 12 in direction T, and is used to temporarily maintain stud 12 in its stretched or tensioned condition. As stud 12 is stretched in direction T, nut 18 and retaining ring 20 are displaced in direction T. While the hydraulic pressure is maintained in chamber 60, retaining ring 20 is turned down to thereby bring retaining ring 20 into abutting engagement with washer 16 and, in turn, bring washer 16 into abutting engagement with flange 14. The engagement of retaining ring 20 with stud 12 via nut 18 and with flange 12 via washer 16 maintains stud 12 in its stretched or tensioned condition when the hydraulic pressure is removed from chamber 60.

It should be particularly noted that the load cell 30, formed conjunctively in part by piston 24 and cylinder 26, of PNTS 10 has a relatively small footprint and is threaded onto nut 18. Thus, load cell 30 of PNTS 10 is disposed "above" the nut and stud, i.e., axially adjacent the nut and stud, rather than radially surrounding the nut and stud as in conventional stud tensioning systems. Disposing the load cell axially adjacent rather than radially surrounding the nut and stud substantially reduces the footprint required for PNTS 10 relative to conventional tensioning systems.

It should be further particularly noted that PNTS 10 is well suited for retrofit applications where surfaces of an existing flange and/or stud are not adapted for use with conventional tensioning systems. The bores or perforations 28a, 28b in nut 18 and posts 22a, 22b disposed respectively therein protrude axially outside of nut 18 and thereby position the tensioner foot, i.e., the interface of posts 22a, 22b and outer surface 44a of piston 24, inside the diameter of nut 18. By doing so, the total diameter of space required for use of PNTS 10 is reduced relative to conventional stud tensioning systems. Therefore, PNTS 10 can be used in applications having more finely spaced studs than a conventional stud tensioning system.

It should be even further particularly noted that by disposing load cell 30 of PNTS 10 axially adjacent stud 12 and nut 18, the size of the pressure area of the load cell is substantially maximized, and thus the load capacity is increased without increasing the radial or diametrical footprint of PNTS 10.

It should also and still further be particularly noted that load cell 30 of PNTS 10 is removed after stud 12 is tensioned and retaining ring 20 is turned down. The removal of the load cell lowers total cost of PNTS 10 and eliminates temperature and durability limitations, and environmental concerns, of conventional tensioning systems as described herein.

In the embodiment shown, bores 76 of post plate 70 extend only part way through post plate 70. However, it is to be understood that bores 76 can be alternately configured to extend through a greater or lesser amount of, or entirely through, post plate 70.

Figure 3A:
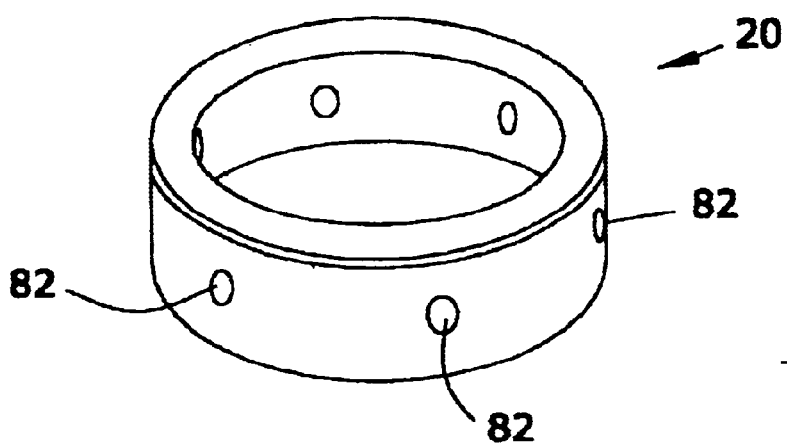
FIGS. 3A–3C are perspective views of various configurations for the retaining ring of the perforated nut tensioning system of FIG. 1.
Figure 3B:
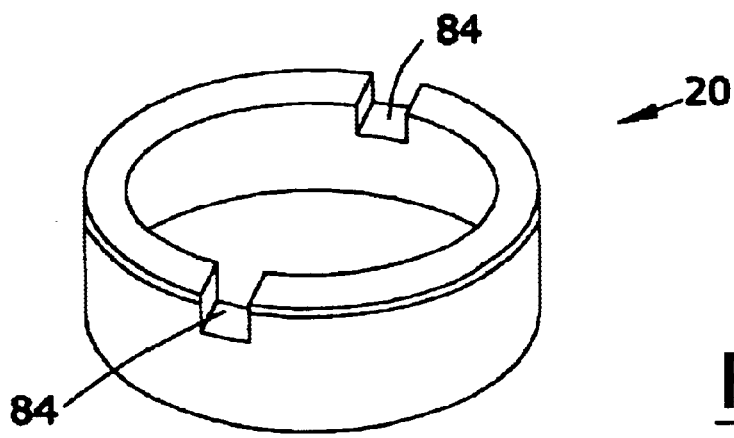
Figure 3C:
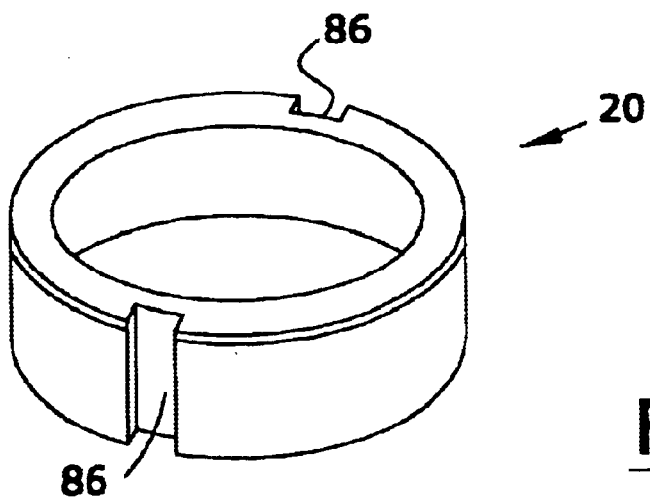

Referring now to FIGS. 3A–3C, various configurations of retaining ring 20 are shown. Referring first to FIG. 3A, retaining ring 20 includes a plurality of wrenching holes 82. Referring now to FIG. 3B, retaining ring 20 is alternately configured with axially-extending wrenching slots 84 that are disposed radially opposite each other on one end (not referenced) of retaining ring 20. Referring now to FIG. 3C, retaining ring 20 is alternately configured with axially-extending wrenching slots 86 that are disposed radially opposite each other on the outer periphery of retaining ring 20.

Figure 4:
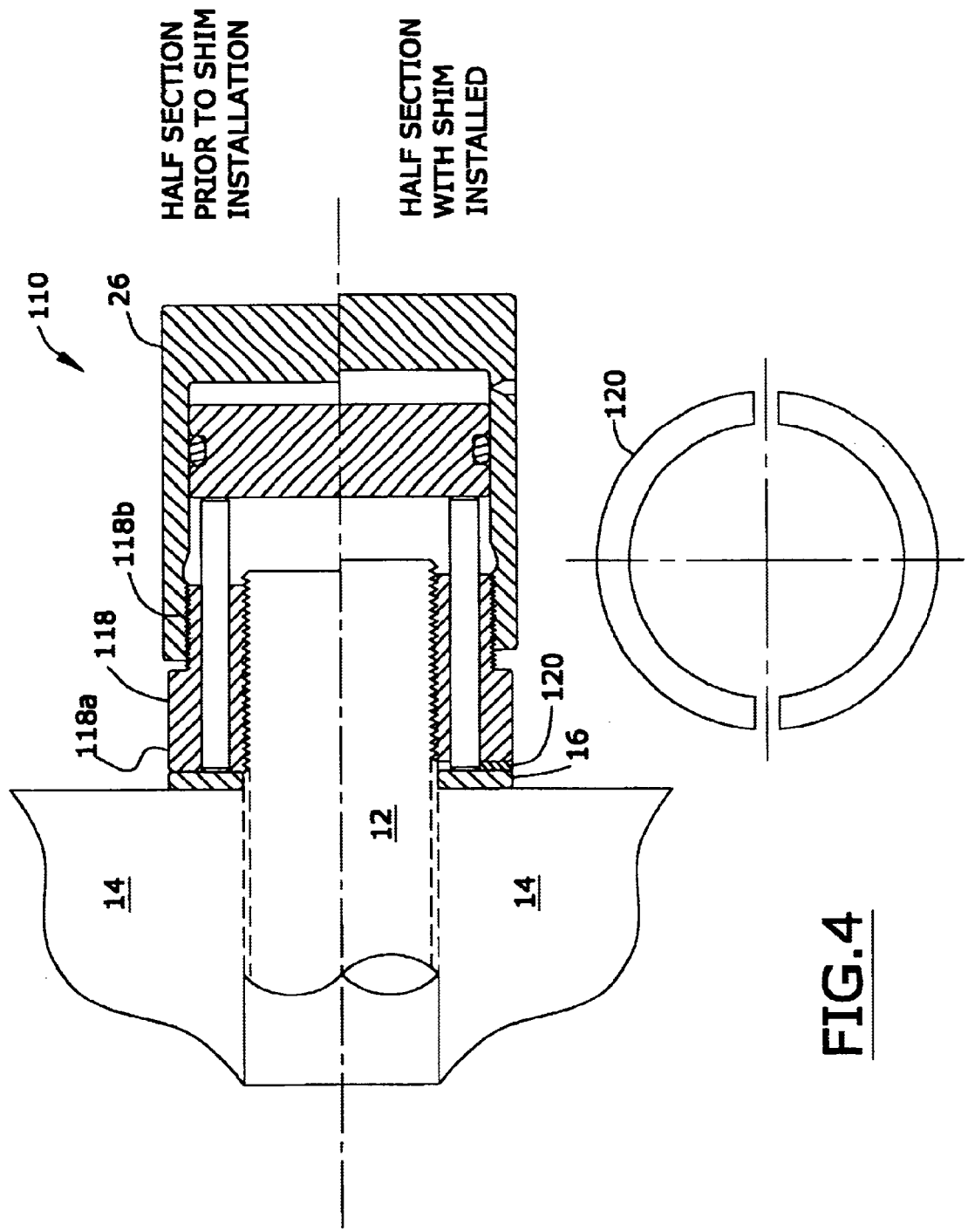
FIG. 4 is a cross-sectional view of a second embodiment of a perforated nut tensioning system of the present invention.

Referring now to FIG. 4, a second embodiment of the perforated nut tensioning system of the present invention is shown. Perforated nut tensioning system (PNTS) 110 is generally similar to PNTS 10. However, PNTS 110 includes a stepped nut 118, having a thicker, or wider outside diameter, portion 118a which, in use, is disposed proximate flange 12 and a thinner, smaller outside diameter, portion 118b which, in use, is disposed opposite flange 12 and in threading engagement with cylinder 26. PNTS 110, as shown, does not include a retaining ring. Rather, with stud 12 in a tensioned or stretched condition, one or more two-piece shims 120 are disposed intermediate nut 118 and washer 16 in order to maintain stud 12 in the tensioned condition upon removal of PNTS 110.

Figure 5:
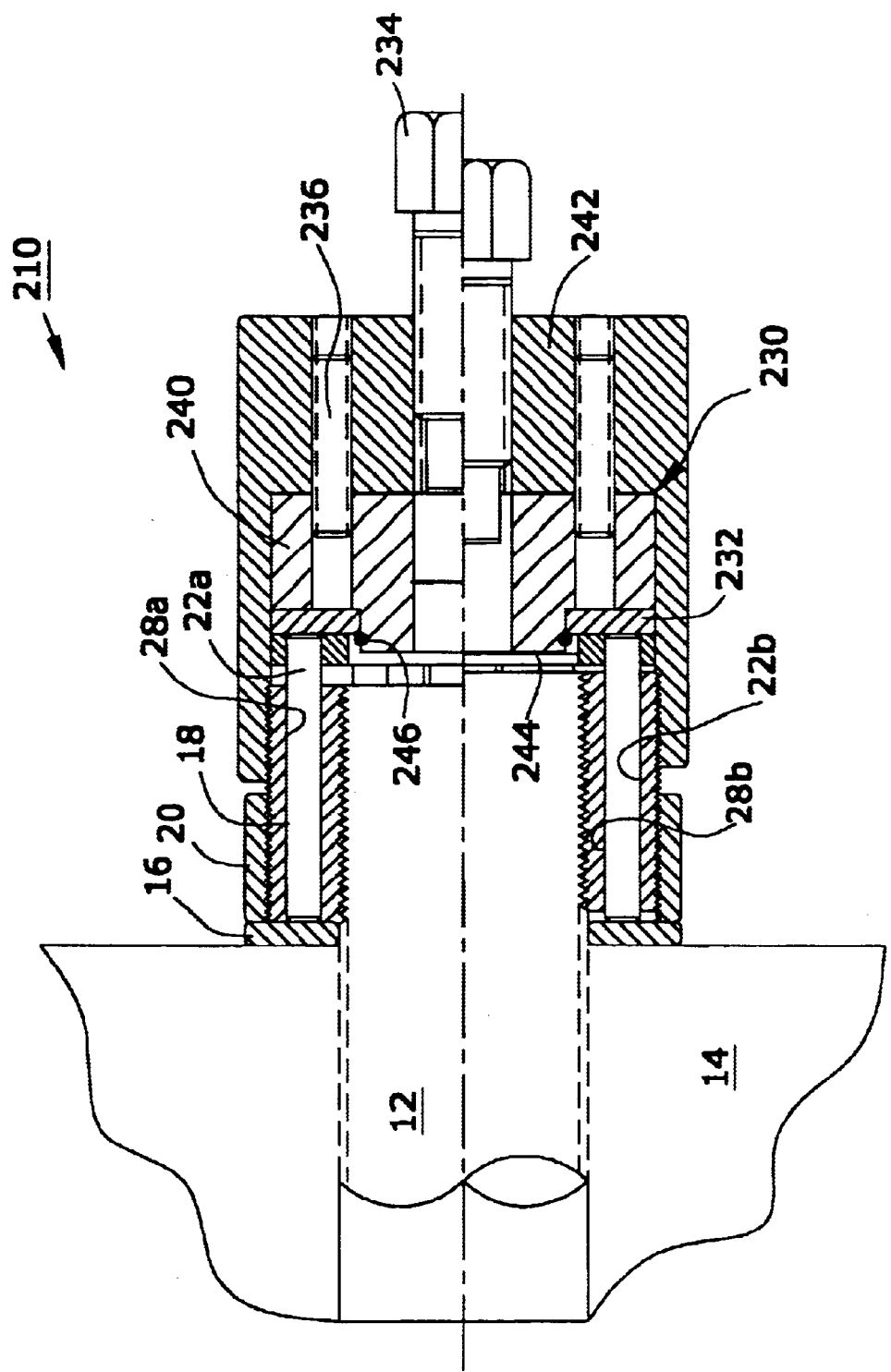
FIG. 5 is a cross-sectional view of a third embodiment of a perforated nut tensioning system of the present invention.

Referring now to FIG. 5, a third embodiment of a perforated nut tensioning system in accordance with the present invention is shown. Generally, PNTS 210 is mechanically actuated rather than being hydraulically actuated as are the previously-described embodiments of the present invention, but is otherwise generally similar to and has many component parts in common with PNTS 10 and 110. More particularly, PNTS 210 tensions stud 12 that protrudes from flange 14, and includes washer 16, nut 18, retaining ring 20, and posts 22a and 22b. Posts 22a and 22b are disposed within bores 28a, 28b, respectively, in nut 18. PNTS 210 further includes load cell 230, piston protection washer 232, actuator screw 234 and anti-rotation pins 236.

Load cell 230 includes piston 240 and cylinder 242, and is actuated by actuator screw 234. Piston protection washer 232 is disposed axially between posts 22a and 22b and the bottom or outer surface 244 of piston 240, and is rotationally coupled to piston 240 by fastener 246, such as, for example, a snap ring. Piston protection washer 232, in use, distributes the load/force between posts 22a, 22b and piston 240, and thereby substantially reduces the likelihood that the outer surface 244 of piston 240 will dent or be otherwise deformed. Further, piston protection washer 232 also substantially prevents locking against rotation of PNTS 210 by ensuring piston 240 is able to rotate relative to support plate 70.

Actuator screw 234 actuates mechanical load cell 230 of PNTS 210, which as described above is conjunctively defined by piston 240 and cylinder 242. Each of piston 240 and cylinder 242 are threadingly engaged by actuator screw 234. The threads (not referenced) of actuator screw 234 are configured such that rotation of actuator screw 234 in a first direction forces piston 240 and cylinder 242 axially apart, whereas rotation of actuator screw 234 in a second direction draws piston 240 and cylinder 242 axially toward each other. Actuator screw 234 thus has pushing threads and pulling threads, with the pitch of the pushing threads being greater than the pitch of the pulling threads, thereby providing a mechanical advantage to movement of the piston. Anti-rotation pins 248 are disposed in respective substantially concentric bores 250 defined in part by piston 240 and in part by cylinder 242, and prevent rotation of piston 240 relative to cylinder 242.

Figure 6A:
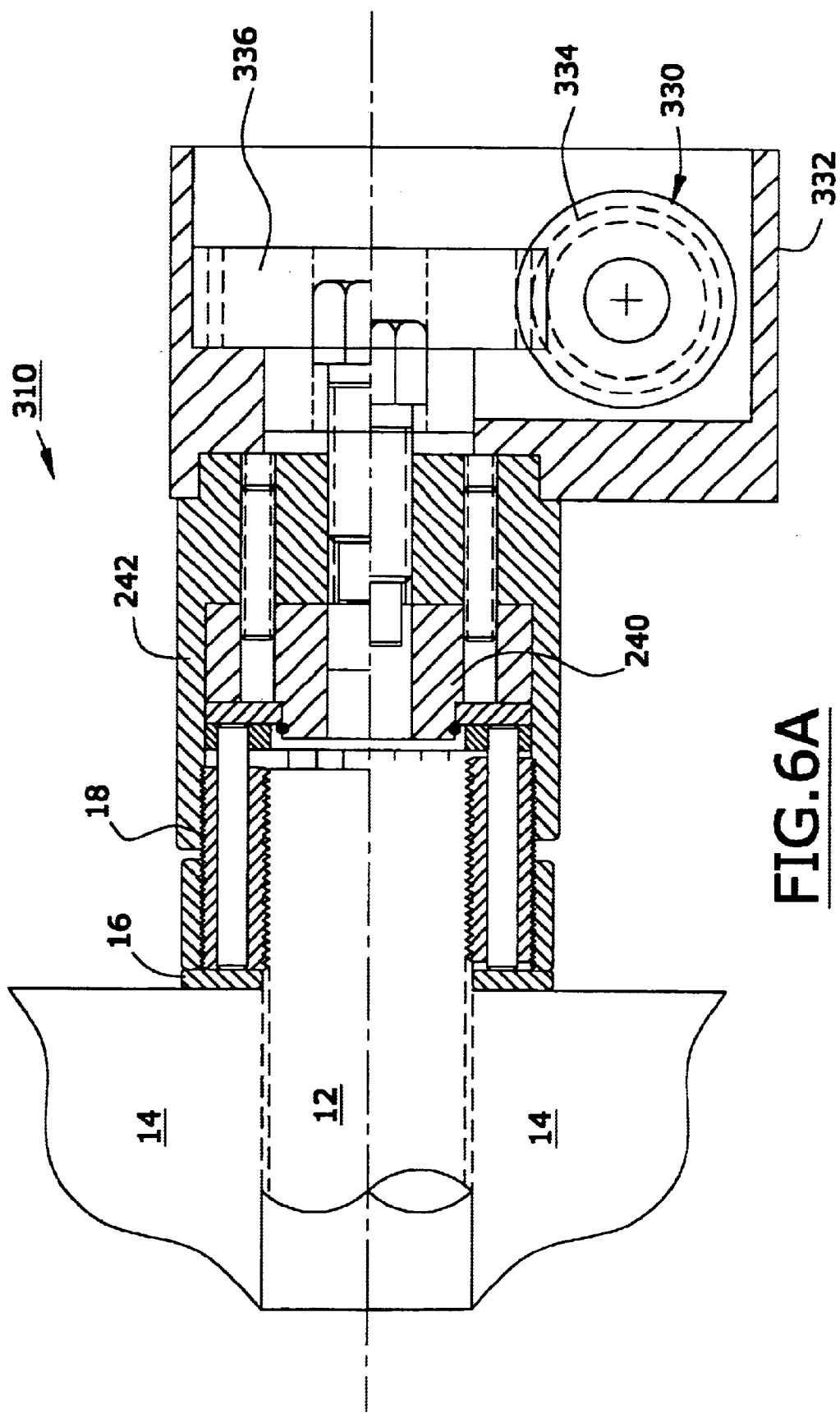
FIG. 6A is a cross-sectional view of a fourth embodiment of a perforated nut tensioning system of the present invention.
Figures 6B, 7:
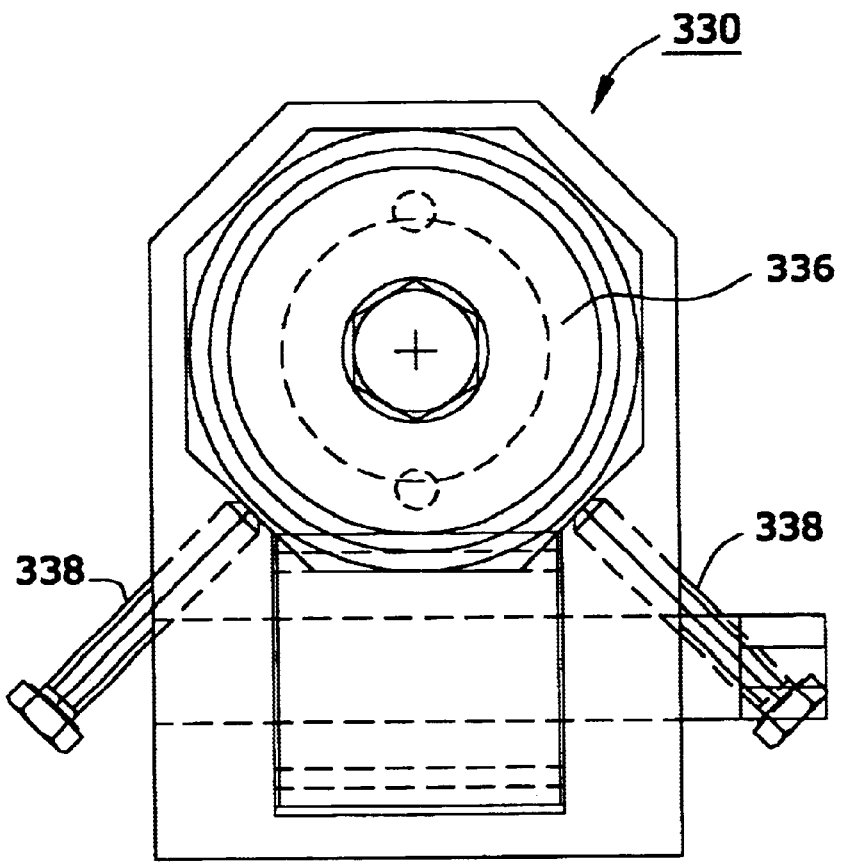
FIG. 6B is a top view of the perforated nut tensioning system of FIG. 6A.
FIG. 7 is a detail view of the threads used on various component parts of the perforated nut tensioning system of the present invention.

Referring now to FIGS. 6A and 6B, a fourth embodiment of a perforated nut tensioning system in accordance with the present invention is shown. Generally, PNTS 310 includes a drive assembly 330 that includes body 332, worm 334 and worm gear 336. Drive assembly 330 is mounted onto and engages PNTS 310 via interfacial surfaces (not referenced), such as, for example, hexagonal interfacial surfaces. Retaining screws 338 retain body 332 in position upon and in engagement with PNTS 310. Worm 334 and worm gear 336, in use, engage and rotate actuator screw 232, via corresponding and respective hexagonal interfacial surface, thereby facilitating installation and removal of PNTS 310.

Referring now to FIG. 7, a detail cross-sectional view of the threads optionally used on external threads 34 of nut 18, internal threads 36 of retaining ring 20, and internal threads 58 of cylinder 24. Threads 34, 36 and/or 58 are canted or buttressed such that the active flank or surface F of the threads are generally perpendicular to the direction of force T acting thereon. With the surfaces F of the threads canted with respect to the force acting thereon, the radial force component present in non-canted threads is substantially reduced. Reduction of this radial force component is particularly beneficial in relatively thin-walled components, such as retaining ring 20 and cylinder 26. Nut 18 may also have canted internal threads if the corresponding threads of stud 12 are also canted.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A stud tensioning device for tensioning a stud having a free end that projects from a structural member, the stud having a central axis, said stud tensioning device comprising:
    a nut having internal threads and external threads, said internal threads configured for engaging corresponding threads on the stud, at least two axial bores defined by said nut;
    at least two posts, each said post having a respective first and second end, each said post being disposed in a corresponding one of said bores, each said first end configured for engaging a stop surface, each said second end being disposed external to said bores and extending axially beyond the free end of the stud in a direction away from the structural member;
    a load cell configured for threadingly engaging said external threads of said nut, said load cell applying an axially-directed force on said posts in a direction toward the structural member and on said nut in a direction away from said structural member to thereby tension the stud.

2. The stud tensioning device of claim 1, wherein said load cell comprises a hydraulic load cell.

3. The stud tensioning device of claim 2, wherein said hydraulic load cell comprises:
    a cylinder having a closed end and an open end, said open end threadingly engaging said external threads of said nut, said closed end being disposed axially beyond said second end of said posts in a direction away from the structural member, a hydraulic port defined by said cylinder;
    a piston disposed within said cylinder, said piston having an inner and an outer surface, said inner surface facing said closed end of said cylinder; and
    a hydraulic chamber defined between said inner surface of said piston and said closed end of said cylinder, said hydraulic chamber being radially bounded by a portion of a sidewall of said cylinder, said hydraulic chamber in fluid communication with said hydraulic port.

4. The stud tensioning device of claim 3, wherein said stop surface comprises a washer that is received over the stud, said washer being disposed axially between said first end of said posts and the structural member.

5. The stud tensioning device of claim 4, further comprising a retaining ring, said retaining ring threadingly engaging said external threads of said nut and being disposed axially between said washer and said open end of said cylinder.

6. The stud tensioning device of claim 3, further comprising a retaining ring, said retaining ring threadingly engaging said external threads of said nut and being disposed axially between the structural member and said open end of said cylinder.

7. The stud tensioning device of claim 3, further comprising a support and alignment plate having a top and bottom surface, said plate defining axial plate bores, said posts being received within said plate bores, said plate being disposed axially between said nut and said outer surface of said piston such that said top surface of said plate is opposite said outer surface of said piston.

8. The stud tensioning device of claim 7, wherein said plate bores extend partially through said plate, said second ends of said posts being disposed within said plate bores, said top surface of said plate engaging said outer surface of said piston when said device is actuated.

9. The stud tensioning device of claim 7, wherein said plate bores extend completely through said plate, said second ends of said posts engaging said outer surface of said piston.

10. The stud tensioning device of claim 3, wherein said cylinder includes inner threads that engage said external threads of said nut, said retaining ring includes internal threads that engage said external threads of said nut, each of said internal threads and said external threads of said nut, said internal threads of said cylinder, and said internal threads of said retaining ring include respective thread faces, at least one of said thread faces being substantially perpendicular to the central axis of the stud.

11. The stud tensioning device of claim 3, further comprising a piston protection washer disposed between said second end of said posts and said outer surface of said piston.

12. The stud tensioning device of claim 1, further comprising a support and alignment plate having a top and bottom surface, said plate defining axial plate bores, said posts being received within said plate bores, said plate being disposed axially between said nut and said load cell.

13. The stud tensioning device of claim 12, wherein said plate bores extend partially through said plate, said second ends of said posts being disposed within said plate bores, said top surface of said plate engaging said outer surface of said piston when said device is actuated.

14. The stud tensioning device of claim 12, wherein said plate bores extend completely through said plate, said second ends of said posts engaging said outer surface of said piston.

15. The stud tensioning device of claim 1, wherein said load cell comprises a mechanical load cell.

16. The stud tensioning device of claim 15, wherein said mechanical load cell comprises:
- a cylinder having a closed end and an open end, said open end threadingly engaging said external threads of said nut, said closed end being disposed axially beyond said second end of said posts in a direction away from the structural member;
- a piston disposed within said cylinder, said piston having an inner and an outer surface, said inner surface facing said closed end of said cylinder; and
- actuating means forcing said cylinder and piston apart in an axial direction.

17. The stud tensioning device of claim 16, wherein said stop surface comprises a washer that is received over the stud, said washer being disposed axially between said posts and the structural member.

18. The stud tensioning device of claim 17, further comprising a retaining ring, said retaining ring threadingly engaging said external threads of said nut and being disposed axially between said washer and said cylinder.

19. The stud tensioning device of claim 16, further comprising a retaining ring, said retaining ring threadingly engaging said external threads of said nut and being disposed axially between the structural member and said cylinder.

20. The stud tensioning device of claim 16, further comprising a support and alignment plate having a top and bottom surface, said plate defining axial plate bores, said posts being received within said plate bores, said plate being disposed axially between said nut and said outer surface of said piston such that said top surface of said plate is opposite said outer surface of said piston.

21. The stud tensioning device of claim 20, wherein said plate bores extend partially through said plate, said second ends of said posts being disposed within said plate bores, said top surface of said plate engaging said outer surface of said piston when said device is actuated.

22. The stud tensioning device of claim 20, wherein said plate bores extend completely through said plate, said second ends of said posts engaging said outer surface of said piston.

23. The stud tensioning device of claim 16, wherein said actuating means comprises an actuator screw.

24. The stud tensioning device of claim 23, further comprising a worm and worm gear engaging said actuator screw.

25. The stud tensioning device of claim 16, further comprising a piston protection washer disposed between said second end of said posts and said outer surface of said piston.

26. The stud tensioning device of claim 16, wherein said cylinder includes inner threads that engage said external threads of said nut, said retaining ring includes internal threads that engage said external threads of said nut, each of said internal threads and said external threads of said nut, said internal threads of said cylinder, and said internal threads of said retaining ring include respective thread faces, at least one of said thread faces being substantially perpendicular to the central axis of the stud.

27. A method of tensioning an externally threaded stud projecting from a structural member, said method comprising the steps of:
- disposing a washer over the stud and adjacent the structural member;
- threadingly engaging a nut onto the external threads of the stud, the nut having internal and external threads and defining at least two bores;
- threadingly engaging a retaining ring onto the external threads of the nut;
- disposing a respective post in each of said at least two bores, said posts extending through said bores and engaging the washer, said posts extending axially outside of the nut in a direction away from the structural member;
- threadingly engaging an open end of a load cell onto the external threads of the nut, a closed end of said load cell being disposed axially beyond the stud relative to the structural member;
- actuating the load cell thereby exerting axially directed and opposed forces upon the posts and the nut;
- maintaining the stud in the tensioned condition by turning the retaining ring down into engagement with said washer and, thereby, the washer into engagement with the structural member; and
- removing the load cell from engagement with the stud.

* * * * *